(12) United States Patent
Gorcea

(10) Patent No.: US 11,677,165 B2
(45) Date of Patent: *Jun. 13, 2023

(54) DEVICES, SYSTEMS, AND METHODS FOR DIRECTIONAL ANTENNAS THAT PROTECT SENSITIVE ZONES

(71) Applicant: Flex Ltd., Singapore (SG)

(72) Inventor: Dan Gorcea, Kanata (CA)

(73) Assignee: Flex Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,349

(22) Filed: Aug. 19, 2021

(65) Prior Publication Data

US 2021/0384649 A1 Dec. 9, 2021

Related U.S. Application Data

(63) Continuation of application No. 16/730,704, filed on Dec. 30, 2019, now Pat. No. 11,114,773.

(60) Provisional application No. 62/786,049, filed on Dec. 28, 2018.

(51) Int. Cl.
| | | |
|---|---|---|
| *H01Q 25/00* | (2006.01) | |
| *H01Q 1/27* | (2006.01) | |
| *H04B 1/38* | (2015.01) | |
| *H04R 1/10* | (2006.01) | |
| *H04R 1/08* | (2006.01) | |

(52) U.S. Cl.
CPC .......... *H01Q 25/005* (2013.01); *H01Q 1/273* (2013.01); *H04B 1/38* (2013.01); *H04R 1/08* (2013.01); *H04R 1/105* (2013.01); *H04R 1/1008* (2013.01); *H04R 1/1041* (2013.01); *H04R 1/1075* (2013.01); *H04R 2420/07* (2013.01)

(58) Field of Classification Search
CPC ........ H01Q 25/005; H01Q 1/273; H04B 1/38; H04R 1/1008; H04R 1/105; H04R 1/1075; H04R 1/08; H04R 1/1041; H04R 2420/07

See application file for complete search history.

(56) References Cited

U.S. PATENT DOCUMENTS

| | | | | |
|---|---|---|---|---|
| 5,721,783 | A * | 2/1998 | Anderson | H04M 1/6066 381/328 |
| 5,887,066 | A * | 3/1999 | Nakagawa | H04R 5/033 381/74 |
| 5,905,464 | A * | 5/1999 | Lanciaux | H04R 25/552 340/979 |
| 6,009,311 | A * | 12/1999 | Killion | H04B 5/06 381/23.1 |
| 6,356,773 | B1 * | 3/2002 | Rinot | H01Q 1/526 455/562.1 |

(Continued)

OTHER PUBLICATIONS

Official Action for U.S. Appl. No. 16/730,704, dated Oct. 20, 2020 11 pages.

(Continued)

*Primary Examiner* — Lewis G West
(74) *Attorney, Agent, or Firm* — Sheridan Ross P.C.

(57) ABSTRACT

A set of headphones include a zone that is sensitive to electromagnetic radiation, a first earpiece including a first directional antenna operable at a first frequency and having a first radiation pattern radiating away from the zone, and a second earpiece including a second directional antenna operable at the first frequency and having a second radiation pattern radiating away from the zone.

19 Claims, 4 Drawing Sheets

(56) References Cited

U.S. PATENT DOCUMENTS

| | | | |
|---|---|---|---|
| 6,639,564 B2 * | 10/2003 | Johnson | H01Q 9/0421 343/702 |
| 7,230,574 B2 * | 6/2007 | Johnson | H01Q 1/243 343/702 |
| 7,254,368 B1 * | 8/2007 | Okada | H04R 1/1041 381/384 |
| 7,567,828 B1 * | 7/2009 | Burson | H04W 88/06 381/313 |
| 9,825,688 B2 * | 11/2017 | Chen | H01Q 3/24 |
| 11,114,773 B2 | 9/2021 | Gorcea | |
| 2003/0151557 A1 * | 8/2003 | Johnson | H01Q 9/42 343/702 |
| 2007/0173300 A1 * | 7/2007 | Estrada | H04M 1/05 455/575.2 |
| 2008/0136712 A1 * | 6/2008 | Suzuki | H01Q 1/38 343/700 MS |
| 2012/0062432 A1 * | 3/2012 | Wu | G01S 5/0252 343/720 |
| 2013/0203363 A1 * | 8/2013 | Graft | H04B 1/3838 455/73 |
| 2014/0187179 A1 * | 7/2014 | Ferguson | H01Q 25/005 343/718 |
| 2017/0289145 A1 * | 10/2017 | Boesen | H04R 1/1016 |
| 2017/0339482 A1 * | 11/2017 | Schrems | G06F 1/1632 |
| 2018/0013195 A1 * | 1/2018 | Hviid | H01Q 1/38 |
| 2018/0077484 A1 * | 3/2018 | Yeung | H04R 1/1075 |
| 2018/0234190 A1 * | 8/2018 | Rauhala | H04B 5/0006 |
| 2020/0103486 A1 * | 4/2020 | Knaappila | G01S 3/8083 |
| 2020/0313301 A1 * | 10/2020 | Hamabe | H01Q 15/14 |
| 2021/0013917 A1 * | 1/2021 | McGaughey | H04B 1/3838 |
| 2021/0167487 A1 * | 6/2021 | Varma | H01Q 25/005 |

OTHER PUBLICATIONS

Notice of Allowance for U.S. Appl. No. 16/730,704, dated Oct. 20, 2020 11 pages.

* cited by examiner

DEVICES, SYSTEMS, AND METHODS FOR DIRECTIONAL ANTENNAS THAT PROTECT SENSITIVE ZONES

CROSS REFERENCE TO RELATED APPLICATIONS

This application is a continuation of and claims priority to U.S. patent application Ser. No. 16/730,704, filed Dec. 30, 2019, which claims the benefits of and priority, under 35 U.S.C. § 119(e), to U.S. Provisional Application Ser. No. 62/786,049, filed on Dec. 28, 2018, the entire disclosures of which are hereby incorporated by reference, in their entirety, for all that they teach and for all purposes.

FIELD

Example embodiments relate generally to devices, systems, and methods for directional antennas, for example, in consumer products such as headphones.

BACKGROUND

Wireless technology is becoming more prevalent as a means to convey and receive information, particularly in the field of consumer electronics where devices such as headphones are desired to be cordless while in use.

DETAILED DESCRIPTION

Related art headphones and other products with zones that are sensitive to electromagnetic radiation have avoided using higher power wireless communication technologies to avoid potential damage to the sensitive zones.

Example embodiments relate to systems, devices, and methods that utilize directional antennas to avoid radiating a zone that is sensitive to electromagnetic radiation. An example of such a zone is the human brain. Thus, a device according to example embodiments may include a set of headphones that are compatible with WiFi, BLUETOOTH, and/or NFC standards to enable easy set-up and longer range capabilities (with WiFi). The headphones may include user-friendly touch sensitive buttons, mechanical buttons, LED indicators, and voice capabilities. Using the Wi-Fi connection, the headphones are capable of streaming higher quality sound at longer ranges than related art systems that use shorter range communication technologies. The headphones may be capable of digital and analog audio streaming, BLUETOOTH calls, and NFC pairing. The headphones may include interfaces for touch, voice, and buttons. The headphones may include digital hybrid active noise control with dual microphones with active noise attenuation>20 dB (500-1000 Hz). The headphones may additionally include passive noise attenuation>12 dB (500-1000 Hz). The headphones may include 40 mm diameter speakers with a frequency response of 5 Hz to 30 kHz. The headphones may include a charging and data port (e.g., USB-C port) and audio jack (e.g., 3.5 mm jack).

Figure 1:
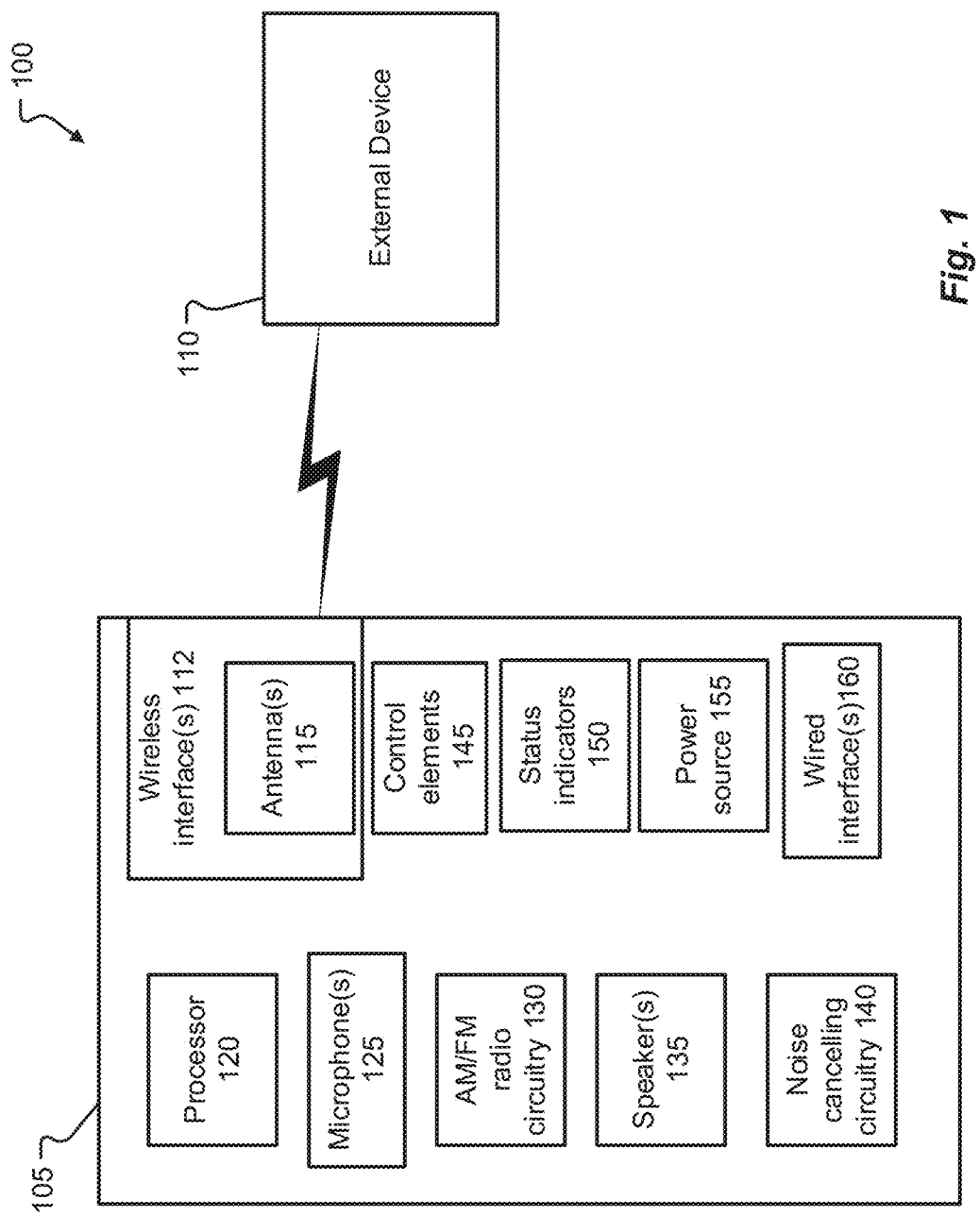
FIG. 1 is a block diagram of a system according to at least one example embodiment.

FIG. 1 is a block diagram of a system 100 according to at least one example embodiment. The system 100 includes a communication device 105 and an external device 110 capable of communicating with one another over a wireless connection at one or more desired frequencies using one or more desired protocols and wireless interfaces. The communication device 105 and/or the external device 110 may be a mobile device such as a smart phone, a piece of wearable technology (e.g., a smart watch, a fitness band, etc.). Additionally or alternatively, the communication device 105 and/or the external device 110 may be a stationary device mounted to or placed on a surface, such as a smart thermostat, or other piece of smart home technology. In other words, the communication device 105 and the external device 110 may be any two devices where wireless communication between the devices is desired. In at least one example embodiment the communication device 105 is a set of headphones and the external device 110 is a transceiver, such as a wireless access point (AP) (see, e.g., FIG. 2). In at least one other example embodiment, the communication device 105 is some other device that includes components or zone(s) desired to be protected from electromagnetic radiation.

The communication device 105 may include one or more wireless interfaces 112 having one or more antennas 115, and a processor 120 that processes signals received and/or sent by the antennas 115. For example, when the antennas 115 are in the presence of the external device 110, the processor 120 may facilitate two-way communication between the communication device 105 and the external device 110 through the antennas 115. Although not explicitly shown, it should be understood that the external device 110 may include its own corresponding IC, wireless interface(s), antenna(s), and/or other components the same as or similar to the communication device 105 to communicate with the communication device 105. In this case, the external device 110 may have the same or similar IC functionality and the same or similar antennas as the communication device 105. Details of the communication device 105, the external device 110, and the antennas 115 are discussed below.

The communication device 105 and/or the external device 110 may be an active device or a passive device. If the communication device 105 and/or the external device 110 is an active device, then a power source (e.g., a battery) may be included in the respective device for providing power to a respective IC. If the communication device 105 and/or the external device 110 is a passive device, then the respective device does not include a power source and may rely on signals received at a respective antenna to power the respective IC. In at least one example embodiment, one of the communication device 105 or the external device 110 is an active device while the other of the communication device 105 or the external device 110 is a passive device. However, example embodiments are not limited thereto, and both devices 105/110 may be active devices if desired.

The wireless interfaces 112 and antennas 115 may be configured to communicate according to one or more wireless protocols (e.g., for near-field communication (NFC), WiFi, BLUETOOTH, global position system (GPS), etc.). According to at least one example embodiments, the antennas 115 include one or more directional antennas that have specific radiation patterns to avoid radiating a particular zone near and/or within the communication device 105.

The processor 120 may comprise one or more processing circuits capable of controlling communication between the communication device 105 and the external device 110, and of processing information for distribution to other elements of the communication device 105. For example, the processor 120 includes one or more of an application specific integrated circuit (ASIC), a processor and a memory (e.g., nonvolatile memory) including instructions that are executable by the processor, programmable logic gates, etc.

The communication device 105 may include one or more microphones 125, amplitude modulation (AM)/frequency modulation (FM) radio circuitry 130, one or more speakers 135 for reproducing sound, noise cancelling circuitry 140, control elements 145, status indicators 150, power source 155, and one or more wired interfaces 160. All of the above aspects of the communication device 105 may be under control of the processor 120.

The microphones 125 may be used for converting sound external to the device 105 into electrical signals for processing by the processor 120. The microphones 125 may be sensitive to voices, ambient noises, etc. The FM/AM radio circuitry 130 may include circuitry for sending and/or receiving FM and AM signals that undergo processing by the processor 120 for sound reproduction by the speakers 135. The speakers 135 may include one or more speaker elements for reproducing sound based on digital and/or analog audio signals. The noise cancelling circuitry 140 may include circuitry for reducing sound external to the speakers 135 by working in conjunction with microphones 125 according to active noise control (ANC) techniques. The control elements 145 may include one or more mechanical buttons, one or more touch sensitive areas, or combinations thereof, that assist to controlling functionality of the communication device 105. Functionality controllable by the control elements 145 may include but is not limited to volume control for the speakers 135, playback control for audio, pairing control for pairing the device 105 with a particular external device 110, voice assistant control, etc. The status indicators 150 may include one or more LED elements (or other light indicators) that indicate various things relating to a status of the device 105, such as battery life, connection status to the external device 110, etc. The power source 155 may include one or more batteries, for example, rechargeable batteries to the above described elements of the device 105. Wired interfaces 160 may include one or more interfaces for connecting the device 105 to external devices. Examples of the wired interfaces 160 include an audio jack, a charging port for charging the power source 155, etc. In at least one example embodiment, the power source 155 may be wirelessly charged, for example, through induction and/or capacitive charging.

Here, it should be appreciated that the communication device 105 and/or the external device 110 may include more or fewer elements than those elucidated above if desired.

Figure 2:
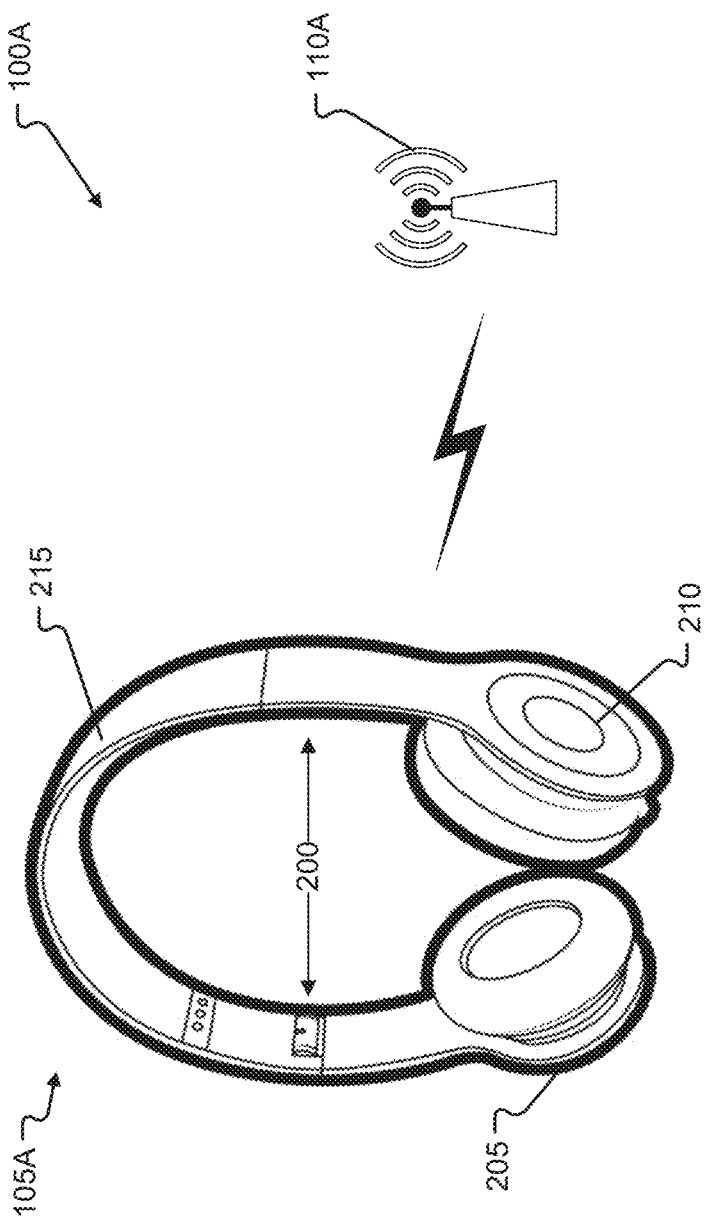
FIG. 2 illustrates an example system where the communication device in FIG. 1 is a set of headphones and the external device is a wireless access point.
Figure 3:
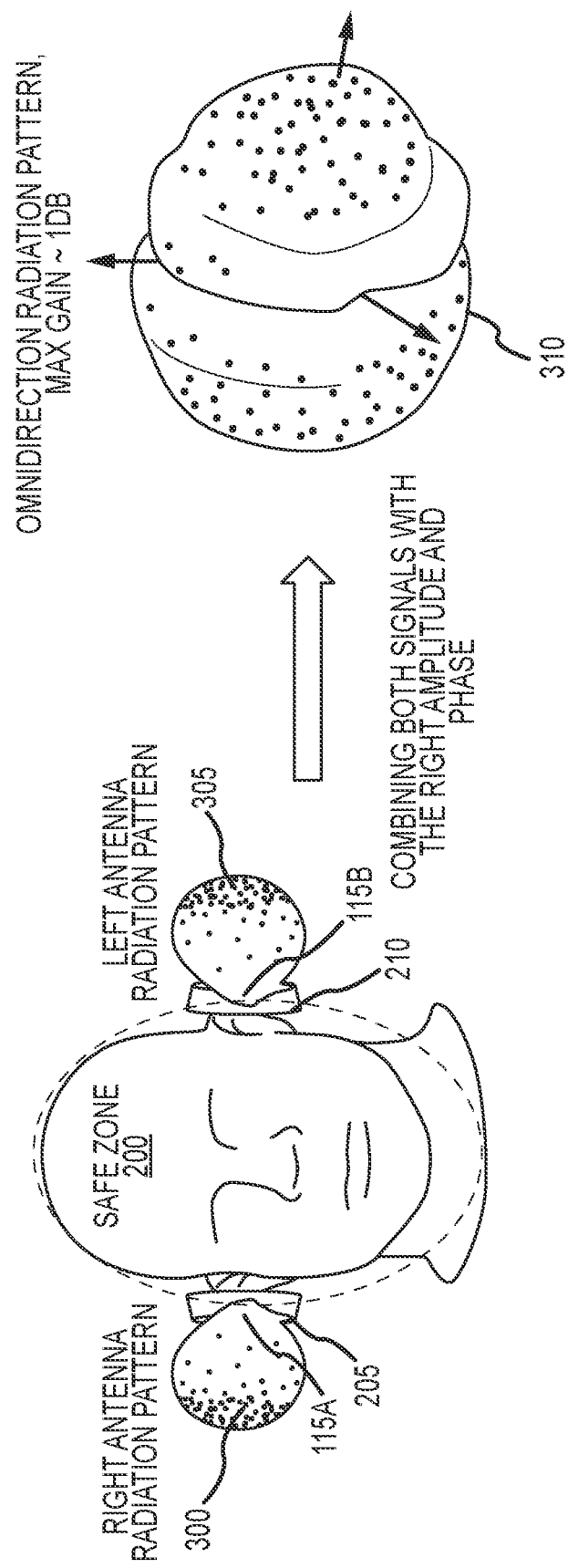
FIG. 3 illustrates radiation patterns of antennas located in the headphones of FIG. 2 according to at least one example embodiment.

FIG. 2 illustrates an example system 100A where the communication device 105 is a set of headphones 105A and the external device 110 is a wireless AP 110A, such as a wireless router. FIG. 3 illustrates radiation patterns of antennas located in the headphones 105A according to at least one example embodiment.

As shown in FIG. 2, the headphones 105A include a zone (or safe zone) 200 that is sensitive to electromagnetic radiation, a first earpiece 205, and a second earpiece 210. In this case, the zone 200 is defined by a region between the first earpiece 205 and the second earpiece 210. As one may appreciate, zone 200 corresponds to a region where the head of a user is typically located when wearing the headphones 105A. In at least one example embodiment, the headphones 105A include a headband 215 connected between the first earpiece 205 and the second earpiece 210. The headband 215 may be stiff and/or flexible. In at least one example embodiment, the headband 215 is omitted so that the earpieces 205 and 210 are separated from one another. In this case, the earpieces 205/210 may have the structure of earbuds.

With reference to FIGS. 1-3, the headphones 105A may include various elements shown in FIG. 1 within the earpiece 205, the earpiece 210, and/or the headband 215. For example, the first earpiece 205 may include a first directional antenna 115A operable at a first frequency and having a first radiation pattern 300 radiating away from the zone 200, and the second earpiece 210 may include a second directional antenna 115B operable at the first frequency and having a second radiation pattern 305 radiating away from the zone 200. In the example of FIG. 3, the first radiation pattern 300 radiates in a direction that is substantially opposite to the second radiation pattern 205 so that the zone 200 is substantially free of radiation. The directional antennas 115A and 115B may have any known antenna structure that provides directionality in the manner shown in FIG. 3. Examples of the directional antennas include patch antennas, arrayed antennas, spiral antennas, horn antennas, dish antennas, etc.

Although not explicitly shown, a first speaker 135 may be housed in the first earpiece 205, and a second speaker 135 may be housed in the second earpiece 210. Each earpiece 205/210 may include one or more microphones 125 that convert sound external to the headphones 105A into electrical signals. The microphones 125 may be used for noise cancellation in conjunction with the noise cancelling circuitry, for receiving voice commands for a user (e.g., for voice assistant applications), and/or for receiving voice during phone calls (e.g., if a mobile phone is connected to the headphones 105A to enable BLUETOOTH calls). The earpiece 205, the earpiece 210, and/or the headband 215 may include one or more control elements 145 that control functionality of the headphones 105A. The headphones 105A may include one or more additional antennas 115 that operate at one or more frequencies different from the first frequency. Thus, the headphones 105A may be able to communicate with external devices using multiple protocols and frequencies. Examples of types of communication possible with the headphones 105A include NFC, BLUETOOTH, and WiFi.

In at least one example embodiment, the first directional antenna 115A and the second directional antenna 115B transceive at one of more frequencies within a range of about 1.4 GHz to about 70 GHz. For example, the processor 120 operates the first directional antenna 115A and the second directional antenna 115B according to the suite of 802.11 protocols associated with WiFi technology to allow a user to stream audio and communicate with other devices over WiFi links. The processor 120 may combine signals received by the first directional antenna 115A and the second directional antenna 115B to form the complete signal transmitted by the wireless AP 110A. In addition, the processor 120 may generate signals transmitted by the first directional antenna 115A and the second directional antenna 115A so that a processor at the wireless AP 110A can combine the signals transmitted by the first directional antenna 115A and the second directional antenna 115B according to known methods, which creates the effect of the headphones 105A having an omnidirectional radiation pattern 310 at the wireless AP 110A while the first radiation pattern 300 and the second radiation pattern 305 are such that the zone 200 experiences a negligible specific absorption rate (SAR) without the use of a shield to shield the zone from radiation of the antennas 115A and 115B. For example, in one test, the headphones 105A exhibited an SAR of 0.020 W/kg in the zone 200 near a user's head, and an SAR of 1.514 W/kg at the user's limbs. Acceptable limits on these SAR values are 1.6 W/kg and 4.0 W/kg, respectively. Here, it should be understood that the signals from the first and second directional antennas 115A/115B may be combined with the assistance of a Wilkinson splitter (e.g., with a splitter on the transmitter and the receiver ends). In at least one other embodiment, the wireless AP 110A may include two separate receivers for receiving the signals from directional antennas 115A and 115B. In this case, the wireless Ap 110A can process the signals without combination.

Although the example of FIG. 3 shows combining signals from the antennas 115A and 115B, it should be appreciated that the system may be capable of switching between each antenna if desired (i.e., diversity switching). For example, internal logic (a processor) at the receiver (e.g., the wireless Ap 110A) may select which one of the first directional antenna 115A and the second directional antenna 115B to utilize for processing based on one or more factors, which may include channel estimates, received signal strength, and/or the like.

Here it should be appreciated that the headphones 105A may be paired with the wireless AP 110A in any known manner including by not limited to NFC pairing methods, BLUETOOTH pairing methods, and pairing methods typically used for WiFi connections. For example, the headphones 105A may have an associated application loadable to a mobile phone that allows a user to enter select an appropriate SSID of the wireless AP 110A and enter a password to pair the headphones 105A to the wireless AP 110A.

Figure 4:
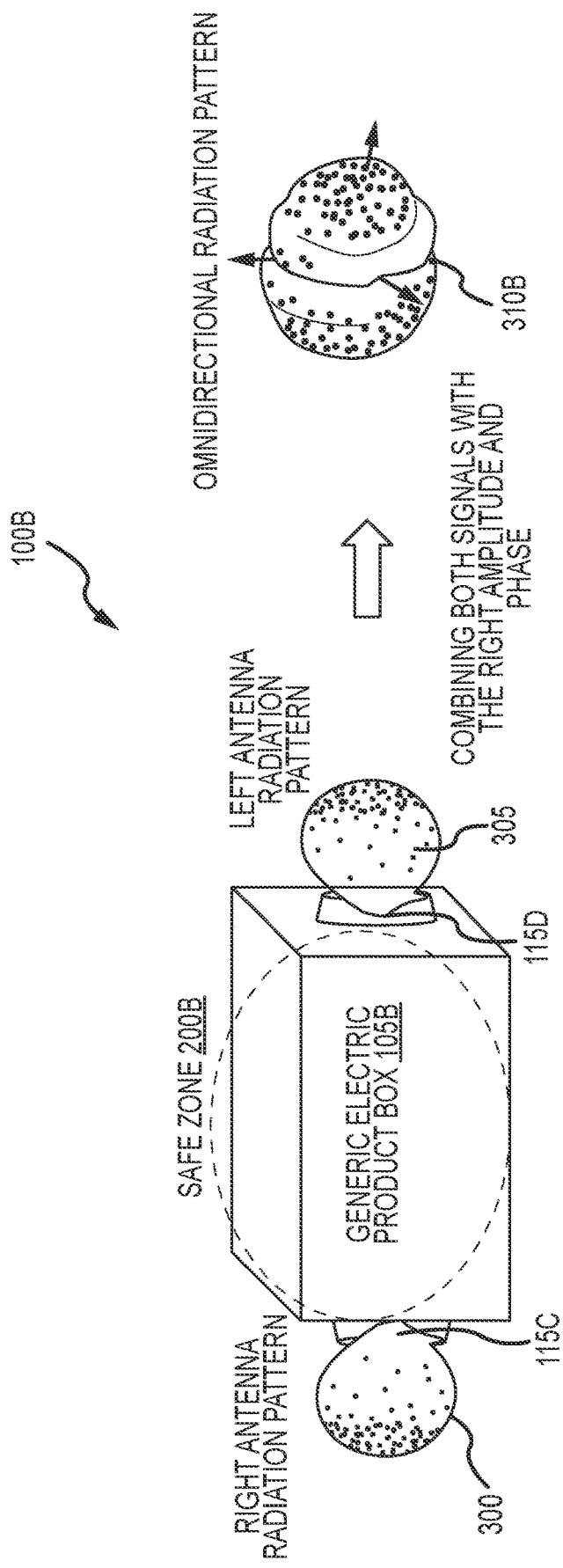
FIG. 4 illustrates an example system in which the communication device in FIG. 1 is a generic device or product box that houses components sensitive to electromagnetic radiation.

FIG. 4 illustrates an example system 100B in which the communication device 105 is a generic device or product box 105B that houses components sensitive to electromagnetic radiation in zone 200B. In this case, the device 105B includes a housing with the zone 200B that is sensitive to electromagnetic radiation. The device 105B may include a first directional antenna 115C located at a first side of the housing and having a first radiation pattern away from the zone 200B, a second directional antenna 115D located at a second side of the housing and having a second radiation pattern away from the zone 200B. In this example, the second side of the housing is opposite to the first side of the housing, but example embodiments are not limited thereto and more or fewer antennas may be included at locations other than those shown in FIG. 4. The antennas 115C/115D may have a same or similar structure as the antennas 115A and 115B from FIGS. 2 and 3 to achieve the same or similar omnidirectional radiation pattern at a corresponding receiving wireless AP (not pictured in FIG. 4).

In view of the above, it should be appreciated that related art headphones or other devices with sensitive zones are limited to low power communication methods, such as BLUETOOTH, due to concerns about higher power signals entering the body and the brain of the user. Thus, the related art is limited in terms of range and volume of information that can be transmitted wirelessly. However, example embodiments employ a directional antenna on each earpiece of the headphones that direct antenna radiation away from a brain and body of the user to avoid such concerns. These directional antennas may be configured for WiFi communication to extend the range and/or bandwidth for streaming audio.

Example embodiments achieves omnidirectionality (reasonable antenna gain in almost any direction, max gain of about 1 dB, are compliant with 802.11b and 802.11g (2.4 GHz), 802.11n and 802.11ac (5 GHz), and achieve negligible SAR (microwave radiation levels to the head). Other advantages include the ability to receive high quality sound allowed by the larger bandwidth Wi-Fi connection, the ability to access the cloud directly as well as any other device on a local Wi-Fi network, the ability store the music files on the cloud, listen to news, connect locally for: music files, phone calls, Tv sound, gaming, etc., and to connect to traditional BLUETOOTH devices.

According to at least one example embodiment, headphones include a zone that is sensitive to electromagnetic radiation, a first earpiece including a first directional antenna operable at a first frequency and having a first radiation pattern radiating away from the zone, and a second earpiece including a second directional antenna operable at the first frequency and having a second radiation pattern radiating away from the zone.

According to at least one example embodiment, the headphones include a headband connected between the first earpiece and the second earpiece, and the zone is defined by a region between the first earpiece and the second earpiece. The headphones include a first speaker housed in the first earpiece, and a second speaker housed in the second earpiece.

According to at least one example embodiment, the first directional antenna and the second directional antenna transceive at one of more frequencies within a range of about 1.4 GHz to about 70 GHz.

According to at least one example embodiment, the headphones include a processor that receives signals received by the first directional antenna and the second directional antenna, and that generates signals transmitted by the first directional antenna and the second directional antenna.

According to at least one example embodiment, the processor operates the first directional antenna and the second directional antenna according to the suite of 802.11 protocols.

According to at least one example embodiment, the first radiation pattern and the second radiation pattern are such that the zone experiences a negligible specific absorption rate (SAR).

According to at least one example embodiment, the headphones include one or more microphones that convert sound external to the headphones into electrical signals.

According to at least one example embodiment, the headphones include one or more control elements that control functionality of the headphones.

According to at least one example embodiment, the headphones include one or more additional antennas that operate at one or more frequencies different from the first frequency.

According to at least one example embodiment, the first radiation pattern and the second radiation pattern are combinable to form an omnidirectional radiation pattern According to at least one example embodiment, a system includes headphones. The headphones include a zone that is sensitive to electromagnetic radiation, a first earpiece including a first directional antenna operable at a first frequency and having a first radiation pattern radiating away from the zone, and a second earpiece including a second directional antenna operable at the first frequency and having a second radiation pattern radiating away from the zone. The system includes a transceiver in communication with the first directional antenna and the second directional antenna.

According to at least one example embodiment, the headphones include a headband connected between the first earpiece and the second earpiece, and the zone is defined by a region between the first earpiece and the second earpiece. The headphones include a first speaker housed in the first earpiece, and a second speaker housed in the second earpiece.

According to at least one example embodiment, the transceiver communicates with the first directional antenna and the second directional antenna at one of more frequencies within a range of about 1.4 GHz to about 70 GHz.

According to at least one example embodiment, the transceiver includes a processor that combines signals received from the first directional antenna and the second directional antenna, and that generates signals transmitted to the first directional antenna and the second directional antenna.

According to at least one example embodiment, the processor communicates with the first directional antenna and the second directional antenna according to the suite of 802.11 protocols.

According to at least one example embodiment, the first radiation pattern and the second radiation pattern are such that the zone experiences a negligible specific absorption rate (SAR).

According to at least one example embodiment, the headphones include one or more microphones that convert sound external to the headphones into electrical signals.

According to at least one example embodiment, the headphones include one or more actuator elements that control functionality of the headphones.

According to at least one example embodiment, the headphones and the transceiver each include one or more additional antennas that operate at one or more frequencies different from the first directional antenna and the second directional antenna.

According to at least one example embodiment, a device includes a housing including a zone that is sensitive to electromagnetic radiation, a first directional antenna located at a first side of the housing and having a first radiation pattern away from the zone, and a second directional antenna located at a second side of the housing and having a second radiation pattern away from the zone. The second side of the housing is opposite to the first side of the housing.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "memory" as used herein refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section(s) 112(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARIVI926EJS™ processors, other industry-equivalent processors, and may perform computational functions using any known or future-developed standard, instruction set, libraries, and/or architecture.

Any of the steps, functions, and operations discussed herein can be performed continuously and automatically.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/ or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
   a first earbud including a first directional antenna operable at a first frequency and having a first radiation pattern radiating away from a zone that is sensitive to electromagnetic radiation; and
   a second earbud including a second directional antenna operable at the first frequency and having a second radiation pattern radiating away from the zone, wherein the zone is defined by a region between the first earbud and the second earbud when worn by a user.

2. The system of claim 1, further comprising:
   a first speaker housed in the first earbud; and
   a second speaker housed in the second earbud.

3. The system of claim 1, wherein the first directional antenna and the second directional antenna transceive at one or more frequencies within a range of about 1.4 GHz to about 70 GHz.

4. The system of claim 1, further comprising:
   at least one processor that processes signals received by the first directional antenna and the second directional antenna, and that generates signals transmitted by the first directional antenna and the second directional antenna.

5. The system of claim 4, wherein the at least one processor operates the first directional antenna and the second directional antenna according to the suite of 802.11 protocols.

6. The system of claim 1, wherein the first radiation pattern and the second radiation pattern are such that the zone experiences a negligible specific absorption rate (SAR).

7. The system of claim 1, further comprising:
   one or more microphones that convert sound external to the first and second earbuds into electrical signals.

8. The system of claim 7, further comprising:
   one or more control elements that control functionality of the first earbud or the second earbud.

9. The system of claim 1, further comprising:
one or more additional antennas that operate at one or more frequencies different from the first frequency.

10. The system of claim 1, wherein the first radiation pattern and the second radiation pattern are combinable to form an omnidirectional radiation pattern.

11. A system, comprising:
a first earbud including a first directional antenna operable at a first frequency and having a first radiation pattern radiating away from a zone that is sensitive to electromagnetic radiation;
a second earbud including a second directional antenna operable at the first frequency and having a second radiation pattern radiating away from the zone, wherein the zone is defined by a region between the first earbud and the second earbud when worn by a user; and
a transceiver in communication with the first directional antenna and the second directional antenna.

12. The system of claim 11, further comprising:
a first speaker housed in the first earbud; and
a second speaker housed in the second earbud.

13. The system of claim 11, wherein the transceiver communicates with the first directional antenna and the second directional antenna at one of more frequencies within a range of about 1.4 GHz to about 70 GHz.

14. The system of claim 11, wherein the transceiver further comprises:
at least one processor that combines signals received from the first directional antenna and the second directional antenna, and that generates signals transmitted to the first directional antenna and the second directional antenna.

15. The system of claim 14, wherein the at least one processor communicates with the first directional antenna and the second directional antenna according to the suite of 802.11 protocols.

16. The system of claim 11, wherein the first radiation pattern and the second radiation pattern are such that the zone experiences a negligible specific absorption rate (SAR).

17. The system of claim 11, further comprising:
one or more microphones that convert sound external to the first and second earbuds into electrical signals.

18. The system of claim 17, further comprising:
one or more actuator elements that control functionality of the first earbud or the second earbud.

19. The system of claim 11, further comprising:
one or more additional antennas that operate at one or more frequencies different from the first directional antenna and the second directional antenna.

* * * * *